United States Patent [19]

Kujawa, Jr. et al.

[11] 4,130,966
[45] Dec. 26, 1978

[54] VENTILATOR HATCH ASSEMBLY

[75] Inventors: Anthony Kujawa, Jr.; Frank J. Kujawa, both of Toledo, Ohio

[73] Assignee: Production Research, Inc., Toledo, Ohio

[21] Appl. No.: 762,863

[22] Filed: Jan. 27, 1977

[51] Int. Cl.² ............................................. B50G 7/08
[52] U.S. Cl. ..................................... 49/141; 49/394; 49/397; 49/401; 49/463; 98/2.14; 296/137 B
[58] Field of Search ................ 49/141, 381, 394, 397, 49/398, 401, 463; 296/137 R, 137 B; 16/176; 98/2.14

[56] References Cited

U.S. PATENT DOCUMENTS

| 2,159,516 | 5/1939 | Ball | 98/2.14 UX |
| 2,229,273 | 1/1941 | Brockway | 49/141 |
| 3,955,848 | 5/1976 | Lutz et al. | 16/171 X |
| 3,974,753 | 8/1976 | Blomgren et al. | 49/397 X |
| 3,979,148 | 9/1976 | Martin | 49/141 X |

FOREIGN PATENT DOCUMENTS 641451 5/1962 Canada ........................................ 52/200

Primary Examiner—Philip C. Kannan
Attorney, Agent, or Firm—Richard B. Dence

[57] ABSTRACT

A ventilator hatch assembly for vehicles, watercraft and the like, which is characterized by having a hatch member, which is interconnected to a mounting frame restable within a ventilation hatch opening for pivotal movements between alternative open ventilating and closed, latched, non-ventilating positions. The hatch cover and mounting frame are interconnected by separable hinge means and separable flip-action or snap-action latch means which operably cooperate to accommodate rapid opening and closing movements of the hatch cover and also to facilitate complete and rapid removal of the hatch cover from the hatch opening to permit the latter to serve as an emergency exit from the vehicle or craft.

20 Claims, 15 Drawing Figures

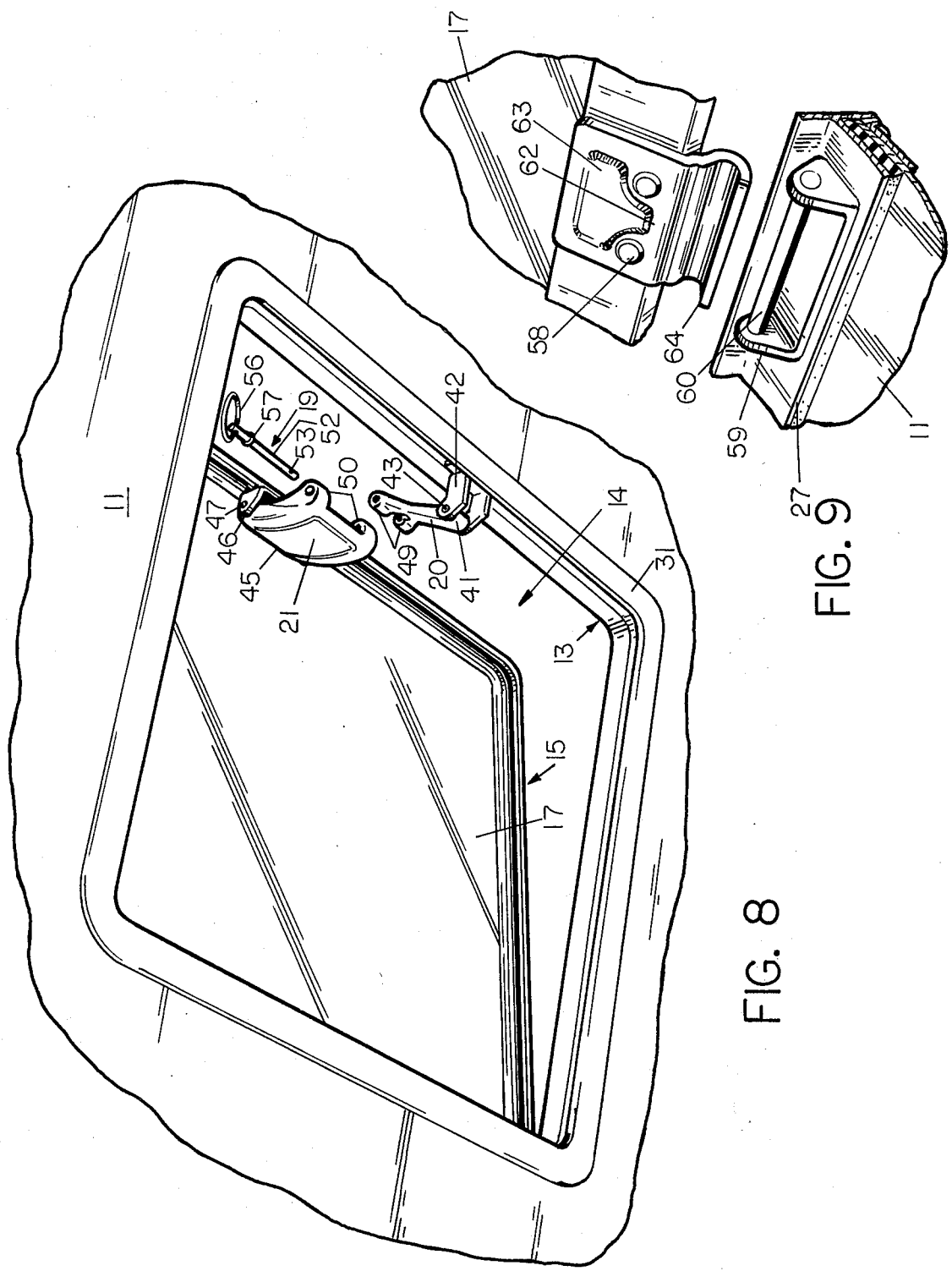

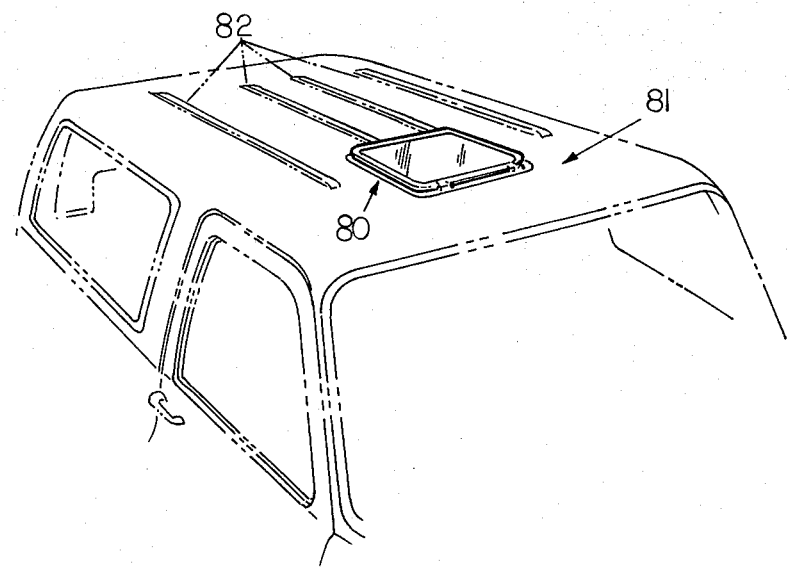
FIG. 13
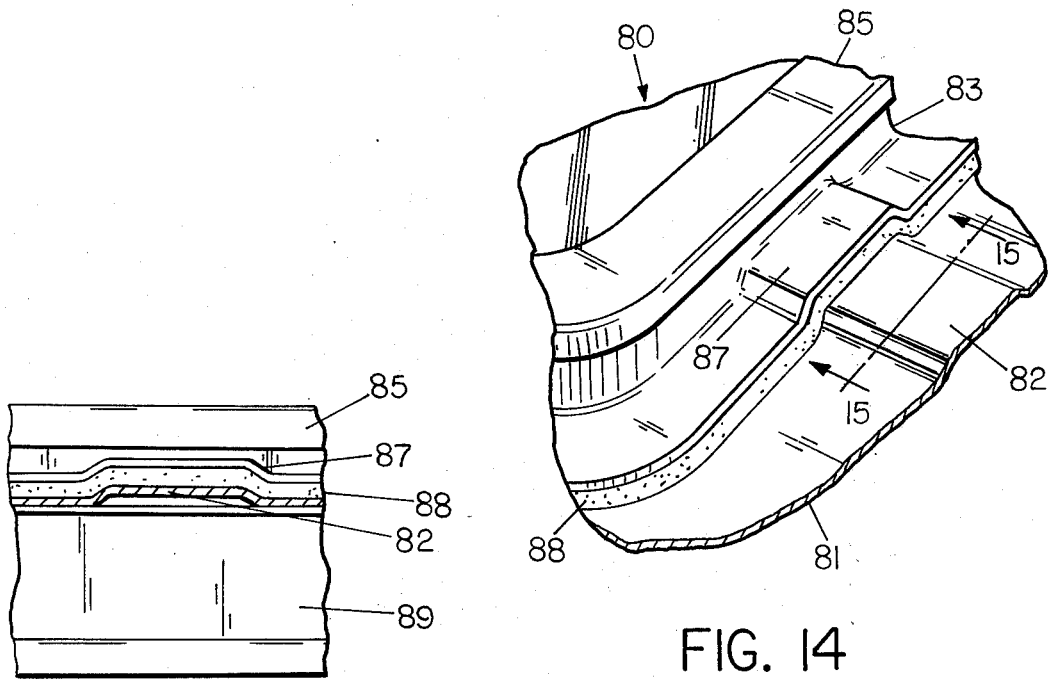
FIG. 15
FIG. 14

VENTILATOR HATCH ASSEMBLY

BACKGROUND OF THE INVENTION

1. Field of the Invention

The invention pertains to hatch assemblies of the types employed for ventilation of passenger compartments of motor vehicles, truck cabs, mobile home units, truck campers, watercraft and the like.

2. Description of the Prior Art

In the past, many types and forms of ventilation units have been developed and employed for the purposes of providing a simple and efficient means of ventilating passenger compartments of motor vehicles, truck cabs, mobile home units, truck campers, watercraft and the like. More recently, ventilator hatch assemblies, or units, or the types suited for use as transparent roof or skylight ventilators have become quite popular and have been utilized extensively for such purposes, whereby they provide the additional functions of being both a light transmissive window structure and a ventilator which optionally may be opened for ventilation purposes or closed when desired. Customarily, most of such ventilating devices and structures comprise an annular frame member shaped to fit snugly within a hatch opening provided in the wall or roof structure of the vehicle or craft. The annular frame member defines a central opening which is spanned by a hatch member, or cover member, pivotally interconnected by suitable hinge members along one side or edge thereof to the annular frame member. Additionally, such ventilator hatch assemblies generally also include manually operable means for pivotally raising and lowering the hatch cover between alternative open and closed positions as well as means for locking the hatch cover in the elected open or closed positions. Not uncommonly, the prior art types of operational mechanisms for raising and lowering the hatch cover include the provision of cranks, guide tracks, slide tracks, push bars, and the like, which while being operational to shift the hatch cover between open and closed positions, are of rather complicated design and are susceptible to inordinate wear and damage, and usually are of relative slow operational movement.

Characteristically, the prior art types of ventilator units are constructed in such manner that the manually operable opening and closing means and hinge means intercooperate to accommodate pivotal movements of the hatch cover only betwen a closed position and a maximum open position which is ordinarily restricted to a position such that the hatch cover is disposed in an acute angular relationship with respect to the plane of the frame member and in an inclined overlying relationship with the hatch opening. In such position, human ingress or egress through the hatch opening is prevented or so obstructed that use of the hatch opening as an emergency escapescape hatch for quick or emergency evacuation of an occupant from the vehicle or craft is impeded or precluded. Moveover, in most instance, such prior art ventilator hatch assemblies have employed hinge means and manual operational devices which interconnect with and are fixedly secured to both the hatch cover and the frame member; the latter of which, of course, is in turn securely mounted to the wall or roof surface regions surrounding the hatch opening. Consequently, the capability of further raising or opening the hatch cover or of detaching or removing the same without the use of tools is in most instances pratically impossible. Thus, removal of the hatch cover for purposes of repair or replacement is rendered difficult. Even more importantly, however, hasty escape by an occupant of the vehicle or craft through the hatch opening in the event of emergency is prevented.

The provision of a readily accessable escape hatch is especially important in connection with the conventional construction of mobile homes and trailer homes which are customarily designed with only one entranceway or doorway to accommodate entrance or departure of occupants. Thus, such vehicles are subject to the ever present danger of obstruction of the only entranceway available in the event of an accident or overturning of the vehicle. In the event of fire or injury to the occupants of the vehicle, their captivity within the vehicle enhances the possibility of even greater disaster. Consequently, a substantial need has been found to exist for a commercially feasible ventilator hatch assembly of relatively simple structure suitable for production line fabrication and assembly, and which through the use of relatively few moveable parts is less susceptible to wear and disrepair while at the same time being capable of functioning smoothly and affording substantial ventilating capability. Attendant with these needs, there is also a great need for incorporating into such a ventilator hatch assembly design features which permit rapid manual detachment of the ventilator hatch cover by an occupant from within the vehicle to provide an alternative avenue of departure or escape from the vehicle in the event of accident or emergency. In keeping with these needs, a ventilator unit embodying such novel design features is especially well-suited for employment in numerous different embodiments such as automobiles, trucks, mobile homes, travel trailers, panel trucks, truck campers, vans, watercraft and the like.

SUMMARY OF THE INVENTION

Briefly, the ventilator hatch assembly of the present invention is designed and constructed in such manner that the hatch assembly features a substantial overall simplicity and employs a simple but durable hinge and latch mechanism which under ordinary conditions of use are responsive to accommodate manually operable pivotal movements of a hatch member, or cover member, between alternative open and closed positions, and in either of which positions the hatch member, or cover member will be firmly held in position by a quick response, flip-action, over center latch mechanism. Additionally, the latch and hinge mechanisms also embody the capability of accommodating quick manual separation or removal of the hatch member, or cover member, facilitate repair or replacement thereof or to provide an escape hatch for the occupants of the vehicle in the event of an emergency.

With these and other features in mind, it is accordingly a principal objective of the present inventin to provide a ventilator hatch assembly which is designed to be mountable over a hatch opening, or ventilation opening, provided in the wall or roof portions of motor vehicles, truck cabs, mobile home units, truck campers, watercraft, and the like which is of durable construction and is characterized by simplicity and ease of operation while incorporating features of added passenger safety.

A more particular objective of the present invention is the provision of a ventilator hatch assembly which while retaining the foregoing characteristics is also capable of being hastily detached and quickly removed by an occupant from the interior confines of the motor vehicle or craft in which the ventilator hatch assembly is installed.

A further objective of the present invention is the provision of a ventilator hatch assembly having the foregoing characteristics and which also is provided with flip-action latching means for securely locking the hatch cover in alternative open and closed positions.

A further particular objective of the present invention is the provision of a ventilator hatch assembly having the last-mentioned characteristics and which also features the inclusion of manually operable means for quickly initiating detachment and removal of the hatch cover while the hatch cover is positioned in either of the alternative open or closed positions.

Another more particular objective of the present invention is the provision of a ventilator hatch assembly having the last-mentioned characteristics and wherein the flip-action latching mechanism is interconnected with the hatch cover and a mounting frame by means of lever arms interconnected to each other by a manually removable pull-pin which permits rapid separation of the latching mechanism and which cooperates with separable hinge means also interconnecting the hatch cover and mounting frame to permit hasty detachment and removal of the hatch cover from the mounting frame.

A further particular objective of the present invention is to provide a ventilator hatch assembly having the last-mentioned characteristics and being of adequate size such that when the hatch cover is detached and removed, the hatch opening may serve as an escape hatch for occupants of the vehicle or craft in which the ventilator hatch assembly is installed.

Another additional objective of the present invention is the provision of a separable hinge assembly between the hatch cover and mounting frame which is of improved design and forms a separable hinge interconnection unobtrusively located on the underside or interior portions of the hatch cover and mounting frame.

Another additional objective of the present invention is the provision of a ventilator hatch assembly provided with a mounting frame particularly shaped to conform snugly with the exterior roof configuration of vehicles such as vans and the like having interspaced, exteriorly offset strengthening ribs.

Other and additional objectives, features and advantages of the present invention will become readily apparent to those ordinarily skilled in the art from the ensuing detailed description taken in conjunction with the annexed drawings whereon the preferred and alternative embodiments of the present invention are depicted.

BRIEF DESCRIPTION OF DRAWINGS

FIG. 8 is a perspective view of the ventilator hatch assembly in an opened position and depicting an exploded view of the latch mechanism with the detachable pull-pin removed preparatory to separation and removal of the hatch cover from the mounting frame; and FIG. 9 is a perspective view of the separable hinge structure components and adjacent fragmentary portions of the hatch cover and mounting frame depicted in FIGS. 5 and 6 upon separation and removal of the hatch cover from the mounting frame; FIG. 13 is a view similar to FIG. 1, but illustrating a ventilator hatch assembly having an alternative form of mounting frame shaped to conform to and accommodate raised longitudinal strengthening ribs formed in the exterior roof surface of a vehicle; and FIG. 14 is an enlarged fragmentary perspective view of a portion of the mounting frame and adjacent roof structure depicted in FIG. 13; and FIG. 15 is a fragmentary sectional view in elevational aspect of the mounting frame and roof structure of FIG. 14, as viewed in the direction indicated by the reference plane 15—15 in FIG. 14.

DESCRIPTION OF THE PREFERRED EMBODIMENTS OF THE INVENTION

Figure 1:
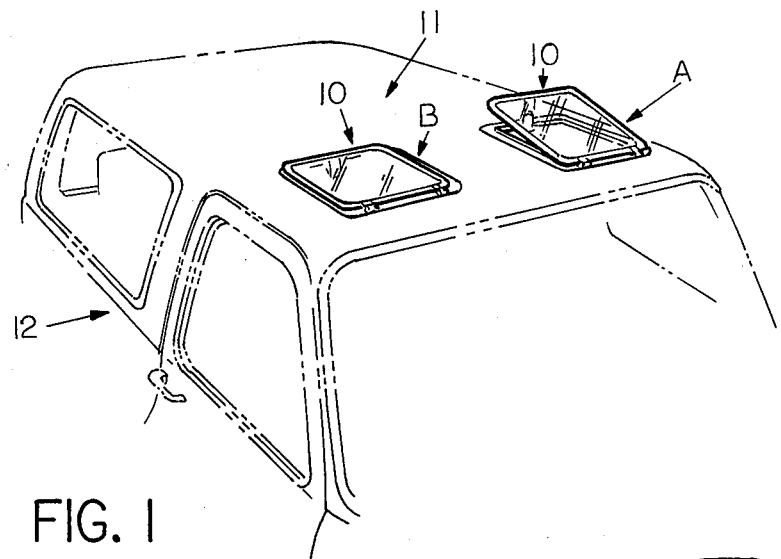
FIG. 1 is a fragmentary perspective view illustrating the ventilator hatch assembly of the present invention in a preferred embodiment mounted in the roof portion of a vehicle and showing two characterizations thereof for the purpose of comparatively depicting the same in alternative open and closed relative positions.
Figure 5:
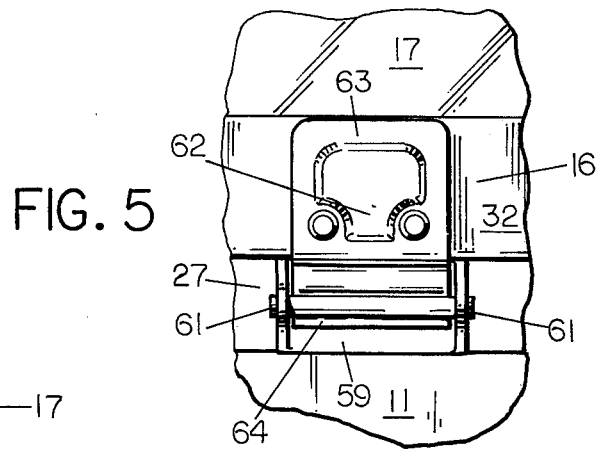
FIG. 5 is an enlarged top view of a portion of one form of the hinge structure and adjacent portions of the hatch cover and mounting frame.

In accordance with one preferred embodiment depicted in the drawings, the present invention is, for illustrative and descriptive purposes only, depicted in FIG. 1 as being embodied in each of two identical ventilator hatch assemblies 10 installed in one of the more common modes of use in the roof 11 of a van-tupe motor vehicle designated generally as 12. As depicted, the ventilator hatch assembly 10 is so constructed and designed that it may be quickly and conveniently operated manually by an occupant from within the interior confines of the motor vehicle when it is desired to position the hatch cover portion of the assembly in a raised or open position indicated by the one ventilator hatch assembly designated at location A, or by lowering the hatch cover portion to the lowered or closed position indicated by the other ventilator hatch assembly designated at location B. The embodiments exemplified in the drawings, of course, are merely of equal preference with many others, and it should be readily recognized that various desirable structural features of the present invention may be individually or completely incorporated or embodied advantageously in many other types of installations such as, for example, truck cabs, mobile homes, travel trailers, truck campers, panel trucks, watercraft and numerous other mobile or stationary embodiments wherein compartmental ventilation is desired or necessitated; provided that the compartment to be ventilated is susceptible to being provisioned with a wall opening leading to or communicating with the ventilator hatch assembly. Moreover, although the present invention is shown as being embodied in the roof portion of a motor vehicle, it is to be understood that is equally well adapted for installation in other suitable locations in any of the aforementioned types of vehicles or the like. For example, installation in the sidewall or rear wall portions of such vehicles, or the like, will also provide the benefits and advantages of the present invention.

Figure 7:
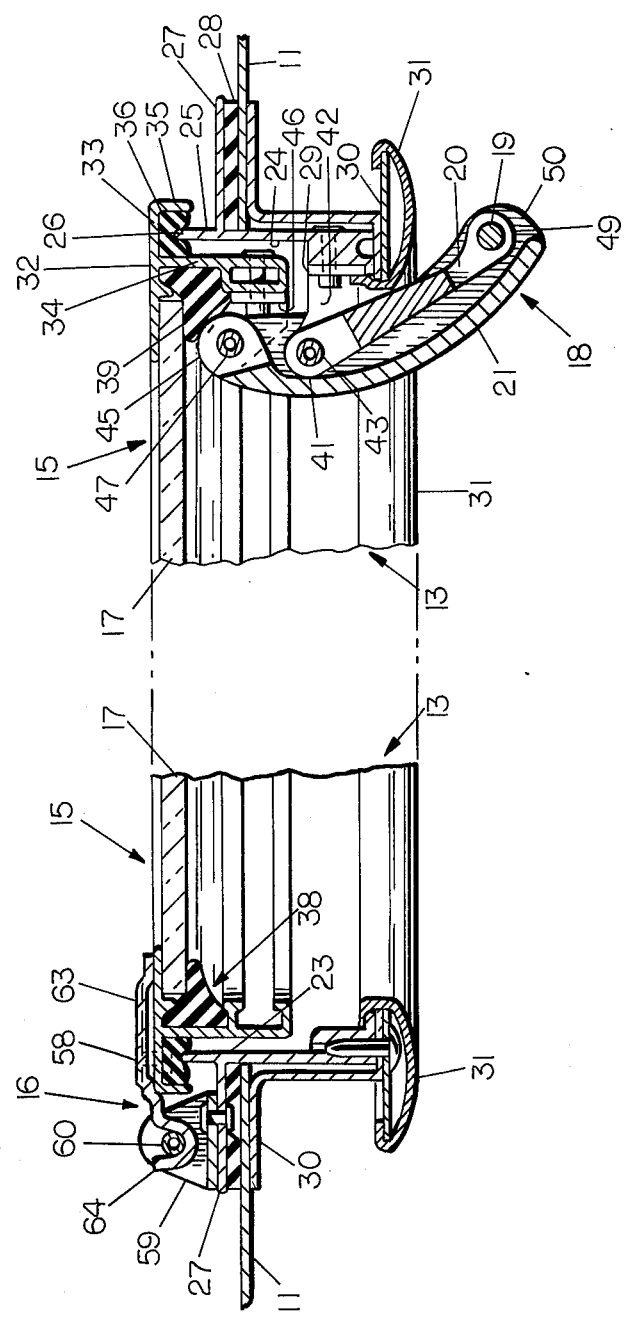
FIG. 7 is an enlarged fragmentary sectional view taken along and in the direction of sectional plane 7—7 in FIG. 2.

Briefly, as best depicted in FIG. 7, the general organization of the ventilator hatch assembly 10 is such that the assembly or unit includes an annular outer frame member or mounting frame 13, which may be of generally rectangular configuration, as illustrated, in the preferred embodiment, or which may partake of various other geometric peripheral configurations shaped to snugly nest within and encompass the peripheral configuration of the ventilation opening or hatch opening, designated generally as 14, in and around which the ventilator hatch assembly is to be mounted. For example, the mounting frame 13 may define, among others, an ovular or circular configuration. The annular construction of the mounting frame affords a stable peripheral encasement on which to arrange and orient a mating cover member, such as a hatch cover 15, which is detachably interconnected or hinged to the mounting frame, as at 16, for pivotal movements between the alternative opened and closed positions indicated respectively at A and B in FIG. 1. As in the form shown in the drawings, the hatch cover 15, if desired, may be provided with a central open portion within which to mount a light transmissive panel 17 of transparent or translucent glass, plastic, or the like, without departing from the features of the present invention. The interconnection between the mounting frame 13 and the hatch cover 15 is designed to accommodate free, hinged pivotal movement of the hatch cover between the aforementioned alternative open and closed positions while retaining the hatch cover interlocked with the mounting frame. Manually operable means for shifting the hatch cover 15 between such alternative open and closed positions are provided in the form of flip-action, lever means 18 interconnected with adjacent edge portions of the mounting frame 13 and hatch cover 15. The intercooperational effects of the hinged interconnection at 16 and the flip-action, lever means 18 provide several highly desirable and advantageous features such as durable and readily operable means of quick manual operation to open or close the hatch cover 15, including positive locking action in both the open and the closed positions of the hatch cover. Additionally, the lever means 18 is designed to urge the hatch cover into tightly sealed relationship with the mounting frame 13 when the hatch cover is locked in closed position.

In accordance with the present invention, and without sacrificing the highly desirable and greatly improved structural and functional characteristics described, the interconnection between the hatch cover 15 and mounting frame 13 is further structured in such manner as to permit and accommodate rapid manual detachment and complete removal of the hatch cover from the mounting frame by an occupant located within the interior of the vehicle, craft, or the like, in which the ventilator hatch assembly 10 is installed. By virtue of the unique structural aspects of the ventilator hatch assembly, the hatch cover 15 not only may be quickly and conveniently removed for purposes of repair or replacement without the need of accessory tools, but even more significantly and importantly, the hatch cover 15 may be hastily detached and removed to permit the hatch opening 14 to serve as an emergency exit through which an occupant of the vehicle or craft may quickly escape in the event of the necessity for emergency departure from the vehicle or craft; particularly when other avenues of escape are rendered inaccessible or hazardous. As best shown in FIGS. 8 and 9, the detachment and removal of the hatch cover 15 is effected by the simple expedient of manually withdrawing a snap-out, pull-pin 19 which also during opening and closing of the hatch cover functions as a pivot pin interconnecting the end portions of separable lever arm components 20 and 21 of the flip-action, lever means 18 and which lever arm components have opposite respective end portions pivotally interconnected with the mounting fram 13 and the hatch cover 15.

In more detailed respects, the annular outer frame member or mounting frame 13 is preferably of metallic construction suitable for fabrication in accordance with conventional metal stamping or other conventional, commercial fabricating procedures. Of course, the frame member, as with many of the other parts to be hereinafter described, while being preferably fabricated from relatively light or medium gauge steel or sheet metal may also be fabricated from other structural materials such as aluminum, plastic, or most any other relatively rigid structural material. In the form illustrated in FIGS. 1-9, the mounting frame 13 includes a vertically disposed annular wall portion 23 having a lower wall section 24 shaped to fit relatively snugly within and conform to the shape of the ventilation opening or hatch opening 14 provided in the wall or roof 11 of the vehicle or craft in which the ventilator hatch assembly 10 is to be installed, and an upper wall section 25 terminating in an upper edge which functions to provide a continuous, peripheral upstanding rim or seat 26 which, as shown, is raised relative to said hatch opening 14 and against which to seat and seal the hatch cover 15 when the latter is lowered and locked in closed position. Integral with the wall portion 23 at a location intermediate the lower and upper wall sections 24 and 25 thereof, there is a laterally outward disposed ledge portion extending continuously around the wall portion 23 to provide a continuous peripheral mounting ledge 27 arranged to seat tightly upon and against the exterior wall or roof 11 and to encompass the ventilation opening or hatch opening 14 provided therein. Preferably, an annular sealing gasket 28 may be disposed between the mounting ledge 27 and the roof 11 or wall surface to assure a weather-tight seal therebetween. Integral with, or otherwise securely interconnected to, the lower wall section 24, lever arm mounting means are provided which may be in the form of mounting block 29 situated adjacent to the location desired for the flip-action, lever means 18. In conventional manner, a suitable interior mounting frame, such as annular, interior mounting frame 30 may be provided having an outwardly flanged upper lip engaging the underside of the roof 11 and a generally inverted T-shaped, cross-sectional lower flanged-end portion to which the lower end of the lower wall section 24 of the mounting frame may be securely bolted, riveted or otherwise fastened in conventional manner to retain the mounting frame in assembled position within the hatch opening 14 and with the mounting ledge 27 pressed firmly against the sealing gasket 28. Also, in conventional manner, an annular, snap-on trim strip, or finish strip 31, of plastic, metal, rubber or other suitable material may be snapped over the lower flanged end portion of the interior mounting frame 30 and lower wall section 24 for improved aesthetic appearance purposes and to cover the securement means between the frame 30 and the wall section 24.

Figure 2:
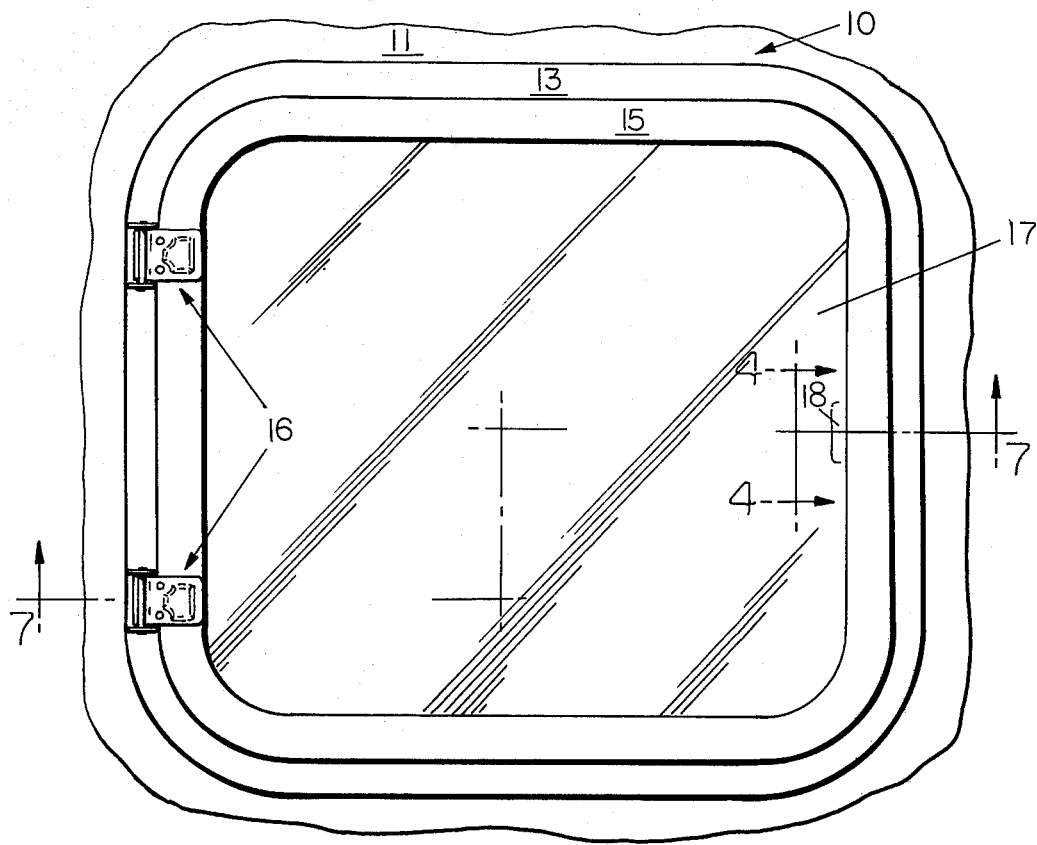
FIG. 2 is a top view of the ventilator hatch assembly shown in FIG. 1 in a closed operative position in association with a fragmentarily depicted portion of the vehicle roof structure; and resilient
Figure 3:
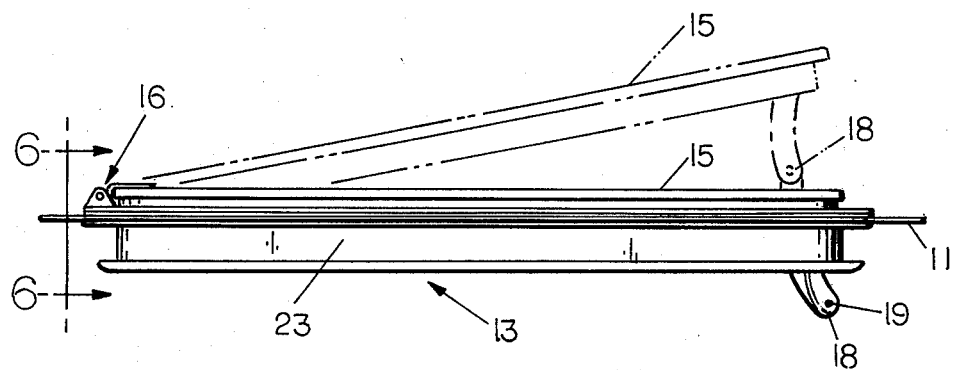
FIG. 3 depicts a side elevational view of the ventilator hatch assembly illustrated in FIG. 2, and for comparative purposes also depicts the same in broken lines in a raised or open ventilating position.

The hatch cover 15, as best shown in FIGS. 2 and 7, is arranged in overlying relationship with the annular mounting frame 13 and the hatch opening 14, and includes an annular main frame 32 characteristically defining an overall peripheral configuration generally corresponding to the general overall peripheral configuration of the mounting frame 13. Structurally, the main frame 32 possesses a generally T-shaped vertical cross-sectional configuration defined by a laterally disposed annular upper rim 33 from the medial underside portion of which there is an integral depending wall section 34 adapted to nest within the vertically disposed annular wall portion 23 of the mounting frame 13 when the hatch cover is in closed position. The upper rim 33 is also provided with a downwardly turned continuous marginal flange 35 which in cooperation with the annular upper rim 33 and adjacent wall section 34 defines in a peripheral downwardly facing channel in which to receive and retain suitable resilient sealing means, such as a resilient rubber or plastic sealing gasket 36, extending continuously around the periphery of the hatch cover 15 and arranged to coincide with and seal against the seat 26 provided by the rim of the upper wall section 25 of the mounting frame 13 when the hatch cover is situated in closed position. Means for mounting a panel 17, which, if desired, may be a light transmissive glass or plastic panel, or the like, within the central opening in the main frame 32, is provided by such conventional means as an inwardly facing peripheral channel, as at 38, suitably formed between the upper rim 33 and wall section 34 of the main frame and in which to receive and retain the marginal edge portions of the panel 17 in weather-tight sealed relationship with a customary glazing strip 39 which may preferably be an annular, formed strip of resilient rubber or plastic material.

The foregoing description of the hatch cover and mounting frame components of the ventilator hatch assembly 10 while being descriptive of a preferred structural form of such components is only intended to provide a better understanding and appreciation of the structural and functional environment of the present invention. By way of distinctive improvement, the present invention provides simple durable means of detachably interconnecting the hatch cover 15 and mounting frame 13 in such manner that, as previously described, the hatch cover in response to manual operation from within the interior confines of a vehicle, or watercraft, or the like, can be quickly and conveniently pivoted and locked into alternative opened or closed positions. Also, the hatch cover can be manually detached and completely removed in rapid manner by an occupant from within a vehicle or craft in which the ventilator hatch assembly is installed.

Figure 4:
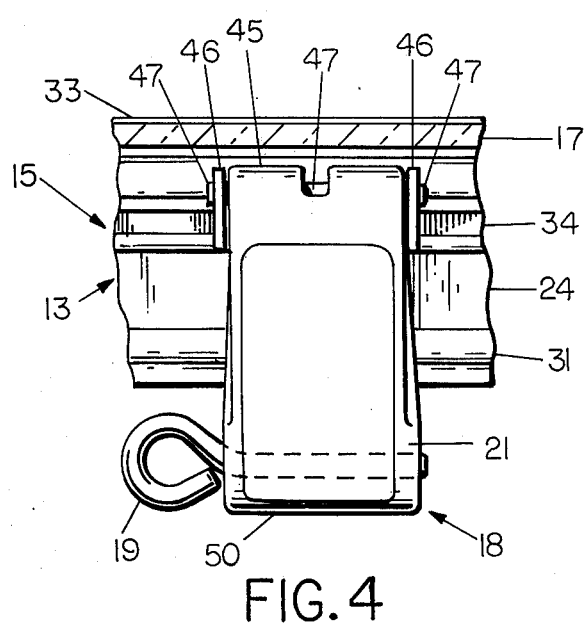
FIG. 4 is an enlarged fragmentary elevational view of the latching or locking mechanism for the ventilator hatch assembly, as viewed in the direction indicated by reference plane 4—4 in FIG. 2, when the ventilation unit is in closed and locked position.
Figure 6:
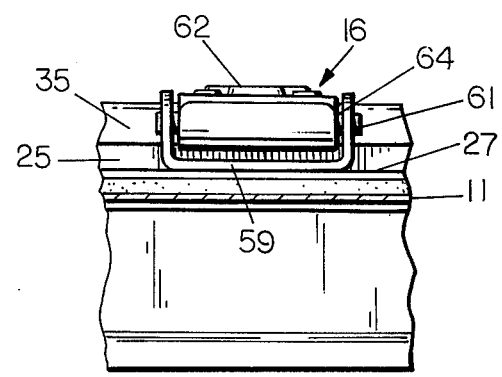
FIG. 6 is a fragmentary elevational view of the hinge structure of FIG. 5 as viewed in the direction indicated by the reference plane 6—6 in FIG. 3.

Keeping the significant features of the improved interconnective aspects or the ventilator hatch assembly 10 in mind, the structural and functional features of the present invention in combination with such a ventilator hatch assembly will now be described in greater detail. As best depicted in FIGS. 4, 7 and 8, the flip-action lever means 18 includes the previously mentioned lever arm component 20, or link arm, which has one end portion 41 designed to pivot about a fixed axis disposed in parallel relationship with the plane of the mounting frame 13. As shown, end portion 41 is interconnected to the mounting frame 13 through a suitable mounting bracket 42 carrying a roll pin 43 extending transversely through and shared by the end portion 41 of the link arm 20 to thereby provide a fixed pivotal axis about which to accommodate pivotal movement of the link arm 20 about its end portion 41. The other lever arm component 21, which is generally C-shaped in cross-sectional configuration, functions as a flip-action handle with which to manually grasp and operate the lever means 18. Lever arm component 21 also has one end portion 45 designed to pivot about a fixed axis which is disposed in parallel relationship with the fixed pivot axis of link arm 20 by being interconnected to the interior side of the wall section 34 of the hatch cover 15 through a mounting bracket 46 carrying a roll pin 47 extending through and shared by the end portion 45 of the handle or lever arm 21.

The other or opposite end portion 49 of the link arm 20 is interconnected to the other or opposite end portion 50 of lever arm component 21, or handle, by means of a mutually shared detachable interconnection, hereinafter described. As best seen in FIGS. 7 and 8, the detachable interconnection between lever arm end portions 49 and 50 is provided by means of the previously mentioned pull-pin 19 which serves as a commonly shared link pin interconnecting end portions 49 and 50 while also permitting the end portions 49 and 50 to rotate relative to each other about the pull-pin during the course of pivotal movements of the lever arms 20 and 21 between extended end-to-end relative positions and retracted folded over relative positions respectively corresponding to the open and closed positions of the hatch cover 15. Additionally, the axis of the roll pin 43 acts as a relative center position and the mutually parallel orientational relationship of the pivotal axes defined by roll pins 43 and 47 permits interlinked lever arm end portions 49 and 50 to swing together in an orbital path downward around roll pin 43 to assume a lower over-center locking position, when placed in the folded over, closed hatch cover locking position, as shown in FIG. 7, and to similarly swing upward to assume an upper over-center locking position, when placed in the end-to-end extended or open hatch cover locking position depicted in broken or phantom lines in FIG. 3. Thus, in the lower over-center or folded over position of the lever means 18 the relative over-center relationship of the pivotal axes defined by roll pins 43 and 47 is such as to resist forcible outside entry into the vehicle. Otherwise stated, it is first necessary to swing lever arm end portions 49 and 50 inwardly and upwardly to unlatch or unlock the hatch cover 15 and permit it to open, since the pivotal axes defined by the pull pin 19 and the roll pin 47 straddle and are in over-center relationship with the axis defined by the roll pin 43. By contrast, when the hatch cover 15 is fully shifted to an open ventilating position the lever arms 20 and 21 will have pivotally unfolded and assumed an end-to-end relationship with the pivotal axis of the pull pin 19 straddled by the pivotal axes of roll pins 43 and 47. Also, in such position the axis of the pull pin 19 will assume an over-center locked position relative to the axis of the pull pin 19 and resist closing of the hatch cover 15 prior to manually pivoting the lever arm end portions 49 and 50 inwardly and downwardly.

As best depicted in FIG. 8, the pull pin 19, or link pin, detachable interconnecting the end portions 49 and 50 of lever arms 20 and 21 is provided with an axially elongated shank portion 52 having a circular cross-section and which is axially insertable through journal openings provided therefor in each of the respective lever arm end portions 49 and 50. The pull pin 19 also includes retaining means for detachably retaining it in assembly with the lever arm end portions 49 and 50 and for preventing the pull pin from becoming accidentally loosened and detached due, for example, to vibrational causes or due to opening and closing movements of the hatch cover 15. Such retaining means preferably may be in the form of a detent, such as a small snap button, or bead 53, positioned on and adjacent to the insertable end, or leading end 54, of the shank portion 52. The size of the detent, or bead 53, is such that it will resist unintentional detachment or disassembly of the pull pin, but in response to relatively slight axial manual force or pressure accommodates insertion or withdrawal of the pull pin through the journal openings in the lever arm end portions 49 and 59. Preferably, the trailing end 55 of the pull pin is provided with manual gripping means, such as a pull ring 56 suitable for grasping by a human finger when quick manual withdrawal of the pull pin is desired or necessary. Additionally, a shoulder which may take the form of a snap ring or lock ring 57 is preferably provided near the trailing end 55 of the pull pin and cooperates with the detent, or bead 53, in restraining the extent of axial play of the assembled pull pin within the lever arms 20 and 21 to thereby reduce vibrational wear and noise. Thus, in accordance with the foregoing features the non-complicated structural aspects of the flip-action lever means 18 not only affords a quick and convenient means of latching the hatch cover 15 in both open and closed positions, but also permits the flip-action lever means to be rapidly disconnected by manual removal of the pull pin 19. When, thus disconnected the hatch cover 15 may be totally inverted to provide unimpeded egress or emergency escape for an occupant of the vehicle, or watercraft, or the like, through the hatch opening 14. Obviously, this feature of the present invention may be accomplished with a conventional, non-separable hinge structure. Preferably, however, the hinge means 16 is constructed in such manner that it serves as a separable or break away hinge so that upon withdrawal of the pull pin 19 the hinge means is separable to permit complete detachment and removal of the hatchcover 15 from the mounting frame 13. One such common form of break away hinge is depicted in FIGS. 5 – 7 and 9. As depicted, this common form of hinge means 16 includes a hatch cover section 58 pivotally interconnected with a selectively separable mounting frame section 59. The mounting frame section 59 of the hinge means comprises a bifuracate or U-shaped hinge bracket suitably riveted or otherwise secured at its base to the mounting frame 13 and having interspaced upstanding flange end portions supporting opposite ends of a hinge pin 60, or roller pin, in parallel relationship with the adjacent upper wall section 25 of mounting frame 13. The counterpart hatch cover section 58 of the hinge means 16 comprises in part a flanged end portion 63 overlying and fixedly secured by suitable conventional means to the upper rim 33 of the hatch cover 15. Additionally, the hinge means includes an opposite upwardly turned end portion 64 defining a U-shaped cross-sectional configuration shaped to nest under and provide an upwardly opening channel in which to snugly seat the hinge pin 60 and thereby separably interconnect the mounting frame section 59 and hatch cover section of the hinge means 16. As thus constructed, the mounting frame section 59 and hatch cover sections 58 of the hinge means remain coupled together during pivotal movements of the hatch cover between alternative open and closed positions. However, removal of the pull pin 19 from the flip-action latch means 18 permits elevation of the hatch cover 15 beyond the normal raised ventilation position to a position, as in FIG. 9, wherein the end portion 64 of the hinge means 16 rotates around and becomes uncoupled from the hinge pin 60 thereby resulting in complete detachment of the hatch cover 15 from the mounting frame 13 and permitting it be totally removed.

Figure 12:
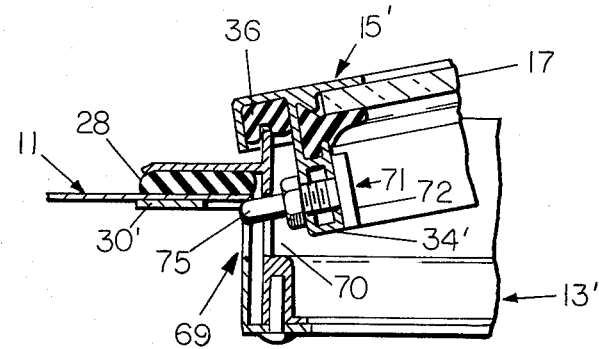
FIG. 12 is a view similar to FIG. 10, but for purposes of operational comparison showing the functional charactistics of the hinge structure when the hatch cover is positioned in a raised and open position.
Figure 10:
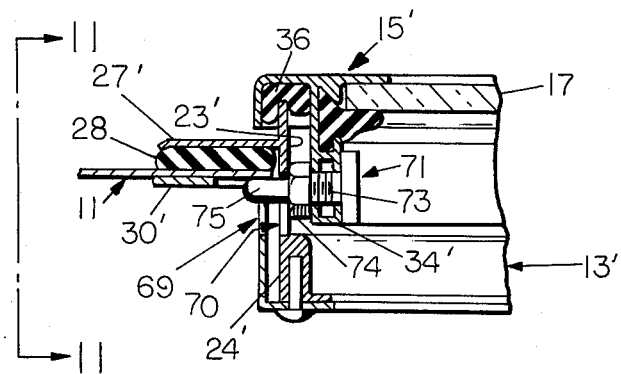
FIG. 10 is a fragmentary sectional view of an alternative form of separable hinge structure of the present invention.
Figure 11:
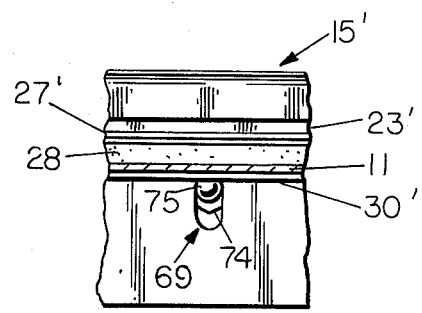
FIG. 11 is a fragmentary elevational view of the separable hinge structure of FIG. 10 as viewed in the direction indicated by the reference plane 11—11 in FIG. 10.

An alternative and innovative form of separable hinge structure embodying additional and improved features of the present invention is depicted in FIGS. 10–12. Unlike the conventional type of separable hinge structure described in conjunction with the embodiment shown in FIG. 1–9 where the hinge component sections 58 and 59 are located exteriorly of the vehicle and are thus subject to view, to being tampered with and to deterioration or damage by adverse weather conditions, in the hereinafter described improved embodiment, the hinge components of the hatch cover 15' and mounting frame 13' are located and structured in such manner that they are protectively situated beneath the underside or interior side of the roof 11 of the vehicle, or the like. In such position they not only enhance the aesthetic characteristics of the installed ventilator batch assembly, but also are essentially protected from damage and weather associated deterioration and the like. Moreover, it has been determined that this improved hinge structure customarily provides a tighter and a more reliable weather-tight seal with the sealing gasket 36 between the hatch cover 15' and mounting frame 13' when the ventilator hatch assembly is positioned in a closed and locked position. Although the structural and functional aspects of only one such separable hingestructure is depicted in FIGS. 10–12, it is, of course, preferred and customary to employ a pair of such hinge structures located generally in the same spaced and locational relationship as the pair of conventional separable hinge structure locations 16 indicated in FIG. 2. Also, with the exception of structural differences associated with the improved separable hinge structure shown in FIGS. 10–12, the ventilator hatch assembly structure may be the same as that depicted in FIGS. 1–9.

In more particular respects, the improved separable hinge structure includes an axially elongated hinge pin 71 which provides a hinged interconnection between the hatch cover 15' and the mounting frame 13'. The hing pin 71, as shown, includes an axially elongated cylindrical shank portion received snugly through a transverse aperture disposed perpendicularly through the integral depending wall section 34' of the hatch cover 15'. The hinge pin 71 is securely retained in assembly with the wall section 34' by suitable retaining means or fastening means such as by having an enlarged head portion 72 on one axial end bolted against the wall section 34' by a nut 74 threadably received on a threaded intermediate section 73 of the shank portion. Arranged in cooperative oppositely facing alignment with the aforementioned transverse aperture in wall section 34', when the hatch cover wall section 34' is nested in tightly closed and locked position (FIG. 10) within mounting frame wall portion 23', there is a pair of axially aligned elongated transverse pivot slots 70 and 69 extending respectively through the wall portion 23' and the directly adjacent parallel wall pf the interior mounting frame 30'. As shown, the longitudinal axes of both of the elongated pivot slots 70 and 69 are disposed in normal or perpendicular relationship with the plane of the hatch cover 15' and consequently have an outwardly or exteriorly disposed rounded terminus and an opposite inwardly or interiorly disposed terminus. Additionally, both slots are arranged in such manner as to receive therethrough the terminal cylindrical, projecting shank end section 75 of the hinge pin 71, but with the rim of the exteriorly disposed terminus of both slots providing bearing surfaces firmly bearing against adjacent contacting surface sections of the shank end section 75 of the hinge pin with sufficient force to urge the sealing gasket 36 on the hatch cover 15' into firm weather-tight sealing engagement with the rim of the mounting frame wall portion 23'. As thus constructed, one side of the hatch cover 15' is firmly clamped to the mounting frame 13' by means of the resilient and flexible hatch cover sealing gasket 36 and the hinge pin 71. As further shown in FIG. 12, the resiliency and flexibility of the sealing gasket 36 permits the firm clamping action to be retained while, by virtue of the yieldability thereof, accommodating pivotal movement of the hatch cover 15' relative to the mounting frame 13'. At the same time, sufficient space tolerance is afforded between the hinge pin 71 and the rim of the interiorly facing terminus of each of the slots 70 and 69 to permit the hinge pin to rock or pivot within both slots without binding therein during alternative movements of the hatch cover 15' between the closed position (FIG. 10) and open ventilating position (FIG. 12). Of course, as with the conventional separable hinge structure depicted in FIGS. 1-9, removal of the pull pin (not shown in FIGS. 10-12) permits the hatch cover 15' to be further elevated and thereby further pivot the hinge pin 71 inwardly and ultimately out of assembly within the slots 70 and 69, whereby the hatch cover 15' will be completely detached and totally removable from the mounting frame 13'.

A further improvement in the ventilator hatch assembly which renders it especially suited for installation in the roof portion of vehicles such as vans which are commonly provided with integral offset roof strengthening ribs is illustrated in FIGS. 13-15. As illustrated, such a ventialtor hatch assembly 80 is installed in a vehicle roof 81 provided with a plurality of mutually spaced, parallel reinforcing or strengthening ribs 82 stretching lengthwise of the roof 81. Although, in accordance with customary present day automotive design, only two of such ribs 82 are for representative illustrative and descriptive purposes depicted as extending beneath only the rearwardly facing side of the mounting frame 83, it will be clearly apparent from the drawings and ensuing description that the features of this aspect of the present invention are applicable to situations wherein any one or more such offsets or recesses are encountered in the installation region marginally surrounding the desired ventilator hatch opening. As best observed in FIG. 14, the mounting ledge, corresponding to the mounting ledge 27 of the embodiment shown in FIG. 7, of the mounting frame 83 is formed with a transverse, exteriorly raised offset section 87 adapted to be superimposed over and closely conform to or nest over an underlying roof strengthening rib 82. As thus formed, a sealing gasket 88 of the type corresponding to the sealing gasket 28 shown in FIG. 7 will provide an effective weather-tight seal between the mounting frame 83 and roof which extends continuously and uninterruptedly around the periphery of the hatch opening. Most importantly, such weather-tight seal will be effected without the necessity of using caulking or similar unsatisfactory patch materials customarily used to attempt to compensate for non-conformity or fit of conventional mounting frames with vehicles having conventional rib strengthening ribs or like obstructions interfering with the flush seating of the mounting frame. Moreover, the provision of one or more offset portions 87, permits the ventilator hatch assembly 80, including the hatch cover 85, annualar interior mounting frame 89, and the mounting frame 83 to embody any of the previously mentioned advantages and features of the present invention.

It will, of course, be understood that various details of construction, combination and assembly may be modified throughout a wide range of equivalents, and it is, therefore, not the purpose to limit the scope of the present invention otherwise than as necessitated by the scope of the appended claims.

We claim:

1. A ventilator hatch assembly for a hatch opening, comprising a frame member including a vertically disposed annular wall portion having a lower wall section and an upper wall section defining a central opening communicating with said hatch opening, said lower wall section being shaped to fit snugly within said hatch opening and said upper wall section providing a peripheral upstanding seat, a hatch member for said central opening, hinge means interconnecting adjacent edge portions of said hatch member and said frame member and accommodating hinged movements of said hatch member between alternative open and closed positions relative to said central opening, said open position of said hatch member being an inclined position overlying said hatch opening and intermediate said closed position and a fully opening position disposed in non-overlying relationship with said hatch opening, said hatch member defining an annular main frame possessing a generally T-shaped cross-sectional configuration defined by a laterally disposed annular upper rim and a depending wall section, said depending wall section being adapted to nest within said frame member and said annular upper rim being adapted to seat against said peripheral upstanding seat when said hatch member is in said closed position, said hinge means being disposed beneath the underside of said hatch opening and comprising a hinge pin carried by said depending wall section of said hatch member, said hinge pin having an axially elongated cylindrical shank portion projecting perpendicularly from said depending wall section towards said frame member, an elongated transverse pivot slot provided in said frame member and receiving said shank portion of said hinge pin therein, said pivot slot having a longitudinal axis disposed in normal relationship with said hatch opening to provide pivotal relative movements of the shank portion of said hinge pin within said pivot slot for accommodating hinged movements of said hatch member between said alternative open and closed positions, said pivot slot having a rim terminus providing a bearing surface firmly bearing against the shank portion of said hinge pin with sufficient force to urge the annular upper rim of said hatch member to firmly clamp against the peripherral upstanding seat of said frame member in tight sealing engagement, manually operable flip-action level means interconnecting said annular main frame of said hatch member and said frame member, said level means being responsive to manual manipulation to flip quickly between an alternative retracted position and an extended position corresponding to said closed and inclined open positions of said hatch member, said flip-action level means including fast response manual detachment means accommodating fast manual detachment of the interconnection thereof between said annular main frame of said hatch member and said frame member, whereby siad hatch member may be quickly positioned in a fully open non-overlying position relative to said hatch opening and thereby facilitate ingress and egress through said hatch opening.

2. In a ventilator hatch assembly according to claim 1, wherein said hingemeans includes hinge components which are separable when said hatch member is positioned in a fully open position to thereby accommodate complete removal of said hatch member from said frame membr following detachment of the interconnection of said flip-action level means between said hatch member and said frame member.

3. In a ventilator hatch assembly according to claim 1, wherein said hinge pin is adapted to disengage from said frame member wall section in response to positioning said hatch member in a fully open position following detachment of the interconnection of said level means between said hatch cover and said frame member.

4. In a ventilator hatch assembly according to claim 1, wherein said ventilator hatch assembly is for installation in a hatch opening having a bordering surface provided with a raised rib therein, the further improvement wherein said frame member includes a peripheral mounting ledge adapted to seat upon said bordering surface, and said mounting ledge is provided with an offset channel complementarily conforming to the raised configuration of said rib, whereby said mounting ledge will seat upon and snugly conform to said bordering surface of said hatch opening.

5. In a ventilator hatch assembly according to claim 1, wherein the peripheral upstanding seat of said upper wall section of said frame member is raised relative to said hatch opening, and wherein said annular upper rim of said hatch member defines a peripheral downwardly facing channel having a resilient seaing gasket confined therewithin and arranged to provide a continuous peripheral seat against said peripheral upstanding seat when said hatch member is in said closed position.

6. In a ventilator hatch assembly according to claim 1, wherein said flip action lever means includes a pair of elongated lever arm components interconnected by said manual detachment means in end to end relationship and having opposite end portions pivotally interconnected respectively to said hatch member and said frame member.

7. In a ventilator hatch assembly according to claim 6 wherein said lever arms are shiftable about a fixed pivotal axis between alternative over center latching positions corresponding respectively to said alternative retracted position and said extended position of said lever means.

8. In a ventilator hatch assembly according to claim 6, wherein said detachment means is in the form of a pull pin having an elongated shank portion interconnecting said lever arm components for mutually free relative rotational movements of said lever arm components about the longitudinal axis of said pull pin when said lever arms are shifted between said alternative latch positions.

9. In a ventilator hatch assembly according to claim 1, wherein said frame member wall section defines an aperture through which to receive said hinge pin shank portion, said aperture having a wall surface providing a bearing surface against which to snugly seat said shank portion.

10. In a ventilator hatch assembly according to claim 9, wherein said aperture is in the form of an elongated slot having an elongate axis disposed transversely of the longitudinal axis of said shank portion, whereby said shank portion while confined within said slot may pivot upon said bearing surface in response to movement of said hatch member between said alternative closed and open ventilating position.

11. In a ventilator hatch assembly according to claim 10, wherein said hinge pin shank portion will automatically be withdrawn from said slot in response to movement of said hatch member to a fully open position following detachment of the interconnection of said lever means between said hatch cover and said frame member.

12. In a ventilator hatch assembly according to claim 11, wherein said ventilator hatch assembly is for installation in a hatch opening having a bordering surface provided with a raised rib therein, the further improvement wherein said mounting frame includes a peripheral mounting ledge adapted to seat upon said bordering surface, and said mounting ledge is provided with an offset channel complementarily conforming to the raised configuration of said rib, whereby said mounting ledge will seat upon and snugly conform to said bordering surface of said hatch opening.

13. In a ventilator hatch assembly as defined in claim 1, wherein said flip-action lever means is interconnected with said depending wall section of said hatch member.

14. In a ventilator hatch assembly according to claim 13, wherein said flip-action lever means includes a pair of elongated lever arm components interconnected by said manual detachment means in end-to-end relationship and having opposite end portions pivotally interconnected respectively to said depending wall section of said hatch member and said frame member, and wherein upon detachment of said manual detachment means from said flip-action lever means one each of said lever arm components will remain interconnected respectively with said depending wall section of said hatch member and said frame member.

15. In a ventilator hatch assembly according to claim 14, wherein the lever arm component which is interconnected to said depending wall section of said hatch member functions as a manually operable handle.

16. A ventilator hatch assembly for a hatch opening, comprising a frame member including a vertically disposed annular wall portion having a lower wall section and an upper wall section defining a central opening communicating with said hatch opening, said lower wall section being shaped to fit snugly within said hatch opening and said upper wall section providing a peripheral upstanding seat, a hatch member for said central opening, hinge means interconnecting adjacent edge portions of said hatch member and said frame member and accommodating hinged movements of said hatch member between alternative open and closed positions relative to said central opening, said open position of said hatch member being an inclined position overlying said hatch opening and intermediate said closed position and a fully opened position disposed in non-overlying relationship with said hatch opening, said hatch member defining an annular main frame possessing a generally T-shaped cross-sectional configuration defined by a laterally disposed annular upper rim and a depending wall section, said depending wall section being adapted to nest within said frame member and said annular upper rim being adapted to seat against said peripheral upstanding seat when said hatch member is in said closed position, said hinge means being disposed beneath the underside of said hatch opening and comprising a hinge pin carried by said depending wall section of said hatch member and having an elongated shank portion projecting therefrom and towards said frame member, an elongated transverse pivot slot provided in said frame member and receiving said shank portion of said hinge pin therein, said pivot slot having a longitudinal axis disposed in normal relationship with said hatch opening to provide pivotal relative movements of the shank portion of said hinge pin within said pivot slot for accommodating hinged movements of said hatch member between said alternative open and closed positions, said pivot slot having a rim terminus providing a bearing surface firmly bearing against the shank portion of said hinge pin with sufficient force to urge the annular upper rim of said hatch member to firmly clamp against the peripheral upstanding seat of said frame member in tight sealing engagement.

17. In a ventilator hatch assembly according to claim 16, wherein the peripheral upstanding seal of said upper wall section of said frame member is raised relative to said hatch opening, and wherein said annular upper rim of said hatch member defines a peripheral downwardly facing channel having a resilience sealing gasket confined therewithin and arranged to provide a continuous peripheral seat against said peripheral upstanding seat when said hatch member is in said closed position.

18. In a ventilator hatch assembly according to claim 16, wherein said hinge pin is removable from said pivot slot when said hatch member is positioned in a fully open position to thereby accommodate complete removal of said hatch member from said frame member.

19. In a ventilator hatch assembly according to claim 16, wherein said ventilator hatch assembly is for installation in a hatch opening having a bordering surface provided with an offset rib therein, the further improvement wherein said mounting frame includes a peripheral mounting ledge adapted to seat upon said bordering surface, and said mounting ledge is provided with an offset channel complementarily conforming to the offset configuration of said rib, whereby said mounting ledge will seat upon and snugly conform to said bordering surface of said hatch opening.

20. In a ventilator hatch assembly according to claim 19, wherein said offset rib is raised relative to said bordering surface.

* * * * *